(12) United States Patent
Schuermann et al.

(10) Patent No.: US 10,260,809 B2
(45) Date of Patent: Apr. 16, 2019

(54) METHOD AND PLANT FOR DENITRIFYING BYPASS GASES IN A MULTI-STAGE SYSTEM OF MIXING CHAMBERS IN A PLANT FOR PRODUCING CEMENT CLINKER

(71) Applicant: KHD Humboldt Wedag GmbH, Cologne (DE)

(72) Inventors: Heiko Schuermann, Leverkusen (DE); Florian Nassenstein, Engelskirchen (DE); Andreas Hand, Roesrath (DE); Rolf Gussmann, Cologne (DE)

(73) Assignee: KHD Humboldt Wedag GmbH, Köln (DE)

( * ) Notice: Subject to any disclaimer, the term of this patent is extended or adjusted under 35 U.S.C. 154(b) by 0 days.

(21) Appl. No.: 15/554,163

(22) PCT Filed: Mar. 2, 2016

(86) PCT No.: PCT/EP2016/054381
§ 371 (c)(1),
(2) Date: Aug. 28, 2017

(87) PCT Pub. No.: WO2016/139225
PCT Pub. Date: Sep. 9, 2016

(65) Prior Publication Data
US 2018/0038648 A1 Feb. 8, 2018

(30) Foreign Application Priority Data
Mar. 4, 2015 (DE) .................. 10 2015 002 688

(51) Int. Cl.
*F27B 7/20* (2006.01)
*C04B 7/60* (2006.01)
(Continued)

(52) U.S. Cl.
CPC ............... *F27B 7/20* (2013.01); *B01D 53/56* (2013.01); *C04B 7/364* (2013.01); *C04B 7/43* (2013.01);
(Continued)

(58) Field of Classification Search
CPC B01D 53/56; C04B 7/364; C04B 7/44; F27B 2007/2091; F27B 7/20; F27D 17/004; F27D 17/008
See application file for complete search history.

(56) References Cited

U.S. PATENT DOCUMENTS 5,937,771 A * 8/1999 Sutoh ..................... C04B 7/436
106/745
6,544,032 B1    4/2003 Brentrup
(Continued)

FOREIGN PATENT DOCUMENTS

EP    2287126         2/2011
EP    2287126 A1 *   2/2011 ............. B01D 53/75
(Continued)

OTHER PUBLICATIONS

Goedecke et al. "High Efficiency SNCR for Non-Calciner Kilns—Potentials and Limits", 2014, Cement International, 12, 72-76.*
(Continued)

*Primary Examiner* — Amber R Orlando
*Assistant Examiner* — Syed T Iqbal
(74) *Attorney, Agent, or Firm* — Greer, Burns & Crain Ltd.

(57) ABSTRACT

A method and a corresponding plant for denitrifying bypass exhaust gases in a cement clinker production plant. Raw meal is sintered in a rotary kiln and deacidified in a calciner. A rotary kiln inlet chamber is connected to the calciner directly or by a riser duct. Bypass exhaust gas is drawn off near the inlet chamber. This exhaust gas is guided into a first
(Continued)

mixing chamber, in which the exhaust gas is cooled to between 800 and 950 degrees C., then the exhaust gas is guided through a reaction pipeline segment, wherein the dwell time is between 0.5 and 3 seconds and ammonia, aqueous ammonia solution, or ammonia-releasing substances are injected for denitrification. Then the exhaust gas is guided into a second mixing chamber, in which the exhaust gas is cooled to between 150 250 degrees C. Then the exhaust gas is guided to a filter for dust removal.

5 Claims, 1 Drawing Sheet

(51) Int. Cl.
      *F27D 17/00*       (2006.01)
      *C04B 7/43*        (2006.01)
      *B01D 53/56*      (2006.01)
      *C04B 7/36*        (2006.01)
      *C04B 7/44*        (2006.01)

(52) U.S. Cl.
      CPC ............... *C04B 7/44* (2013.01); *C04B 7/60* (2013.01); *F27D 17/004* (2013.01); *F27D 17/008* (2013.01); *F27B 2007/2091* (2013.01)

(56) References Cited

U.S. PATENT DOCUMENTS

2012/0315590 A1    12/2012    Hansen et al.
2014/0134089 A1     5/2014    Archetti

FOREIGN PATENT DOCUMENTS

WO        0155048      8/2001
WO      2012176161    12/2012

OTHER PUBLICATIONS

International Search Report, dated Apr. 14, 2014, priority document.
"High Efficiency SNCR for Non-Calciner Kilns—Potentials and Limits", Bernward et al., Jan. 2, 2013.
"Alternative control Techniques Document Update—NO x Emissions from New Cement Kilns", Nov. 26, 2007; p. 22, p. 47-73.

* cited by examiner

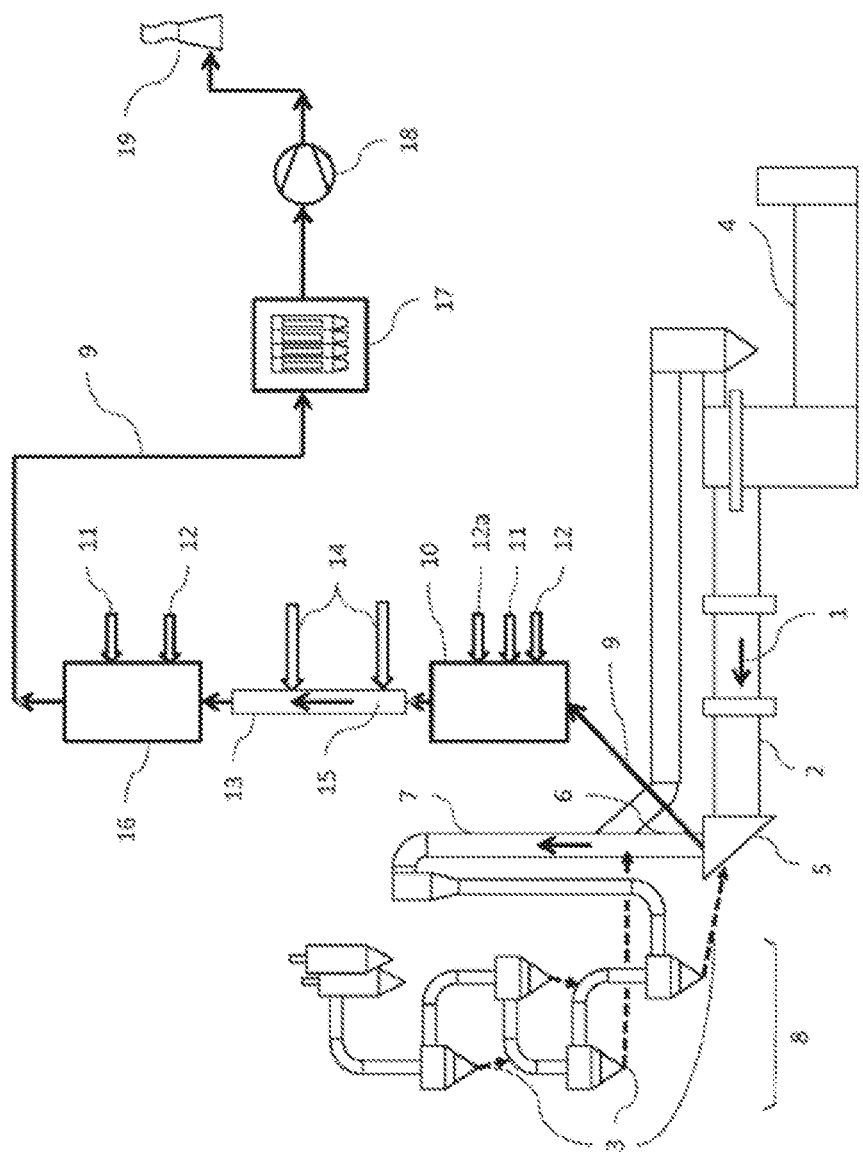

METHOD AND PLANT FOR DENITRIFYING BYPASS GASES IN A MULTI-STAGE SYSTEM OF MIXING CHAMBERS IN A PLANT FOR PRODUCING CEMENT CLINKER

CROSS-REFERENCES TO RELATED APPLICATIONS

This application claims the benefit of the German patent application No. 10 2015 002 688.7 filed on Mar. 4, 2015, the entire disclosures of which are incorporated herein by way of reference.

BACKGROUND OF THE INVENTION

The invention relates to a method for the denitrification of bypass exhaust gases in a plant for producing cement clinker, wherein the plant has a rotary kiln for the sintering of raw meal to cement clinker and has a calciner for the deacidification of the raw meal, downstream of the rotary kiln in the kiln exhaust gas flow direction, the rotary kiln has a rotary kiln inlet chamber which is connected directly or via a kiln riser duct to the calciner, and the bypass exhaust gas is drawn off in the region of the rotary kiln inlet chamber. The invention further relates to a corresponding plant for the denitrification of bypass exhaust gases in the production of cement clinker, comprising a rotary kiln for the sintering of raw meal to cement clinker, the rotary kiln having a rotary kiln inlet chamber, a calciner for the deacidification of the raw meal, the rotary kiln inlet chamber being connected directly or via a kiln riser duct to the calciner, and a takeoff device for drawing off the bypass exhaust gases from the region of the rotary kiln inlet chamber.

Within the overall operation of cement production, plants are employed in which silicate-containing and carbonate-containing raw meal is sintered to cement clinker in a rotary kiln. The sintering in the rotary kiln, which proceeds at temperatures of up to around 1450° C., produces flue gases which, as hot exhaust gases, leave the rotary kiln in the direction opposite to the flow of material, through the inlet chamber of the rotary kiln. In the normal instance, the kiln exhaust gases then flow into a calcining zone, in which the raw meal is deacidified. The calcining zone is most often formed in a kiln riser duct or in a calciner, or in a kiln riser duct and a calciner downstream (in the gas flow direction). The flue gas then flows further into a heat exchanger, designed, for example, as a multistage cyclone heat exchanger, which serves for the preheating of the raw meal. A problem affecting the operation of cement clinker production is the formation and/or release of a series of pollutants. In particular, on account of the high temperatures of the burner flames (about 1800° C. to 2000° C.), nitrogen oxides (NOx) are formed in the rotary kiln by combustion of the nitrogen which is contained within the atmospheric air. The fuel required as well, especially when using secondary fuels such as the replacement fuels obtained from waste, is another source of nitrogen oxides. Given that nitrogen oxides have adverse consequences for people and the environment—as a cause of acid rain, and through breakdown of ozone in the stratosphere, for example—there are strict limits on the emission of nitrogen oxides into the atmospheric environment. In the course of cement production, therefore, methods must be employed for the denitrification of the flue gases.

A further problem is that the raw materials for cement clinker production, and also the fuels employed, especially secondary fuels, contain by-constituents (alkali metal compounds, chlorine, sulfur compounds, heavy metals, etc.) which not only may be detrimental to the quality of the combustion process and/or of the cement clinker, but may also form deleterious substance circuits within the plant for cement clinker production. In the rotary kiln, for example, there is evaporation of alkali metal sulfates and alkali metal chloride compounds, e.g., potassium chloride (KCl). With the kiln exhaust gas, these compounds pass through the kiln inlet chamber into the calcining zone and the heat exchanger, and they condense on the raw meal particles in the cooler regions, and pass with the material stream back into the rotary kiln, where they evaporate again. Further to the disadvantages of such substance circuits for the cement clinker and the combustion process, rapid cooling and condensation of these compounds give rise, through solidification, to caking on the walls of the cooler sections of the circuit, which may cause the plant to become blocked over time.

For the purpose of suppressing substance circuits of this kind in plants for cement clinker production, and for reducing the level of circuit-forming substances, the patent specification DE 197 18 259 B4 discloses drawing off, as a bypass, a part of the flue gas that flows as kiln exhaust gas from the rotary kiln, in the region of the rotary kiln inlet chamber. The phrase "in the region of the rotary kiln inlet chamber," here and below, refers consistently to removal from the rotary kiln inlet chamber or else to removal from the lower end of any kiln riser duct there may be. Even the bypass exhaust gas, however, contains a higher level of nitrogen oxides, and so flue gas denitrification must be performed for the bypass exhaust gas as well.

One widespread method for the denitrification of flue gases involves feeding the NOx-affected flue gases with an aqueous ammonia solution, ammonia (NH3) or ammonia-releasing compounds in a reaction space (see, for instance, the proposal contained in EP 0 854 339 A1). Denitrification then proceeds by the process of selective non-catalytic reduction (SNCR), in which ammonia is converted by thermolysis with the nitrogen oxides into nitrogen and water. These reactions proceed preferably in a temperature window from 800° C. to more than 950° C. For effective implementation, furthermore, it is necessary to realize a timespan which requires precise establishment, and at any rate a minimum time, for the processes within the reaction space. In the case of the desired denitrification of bypass exhaust gas, however, denitrification by the SNCR process proves to be problematic, since the temperatures of the bypass exhaust gas drawn off are too high and, in addition, compliance with the residence time in the reaction space imposes exacting requirements on the operating regime. It is true that the temperature of the exhaust gases in the kiln falls from up to about 1250° C. on entry into the rotary kiln inlet chamber and the lower part of any kiln riser duct that may be present, and yet the gas temperatures of around 1150° C. which still prevail at this point are still so high that reducing agents added would undergo combustion.

One known procedure (DE 197 18 259 B4, DE 199 10 927 A1) is to carry out rapid cooling, preferably to just a few hundred ° C., of the hot bypass exhaust gas stream in mixing chambers, in which a cooling medium such as water or air is injected and is mixed as extensively as possible with the gas stream. This does have the advantage that evaporated substances which are drawn off from the pollutant circuits condense on the surfaces of the particulate solids and can then be removed together with these solids by means of dust filters. For effective denitrification, however, this operation is not suitable.

The German patent application with the number 10 2013 016 701.9 discloses a method for the denitrification of bypass exhaust gases in a plant for producing cement clinker by initially cooling the bypass exhaust gas to temperatures between 260° C. and 400° C. in a mixing chamber, for instance. This is followed by the feeding of the cooled bypass exhaust gas with substances containing ammonia, containing urea and/or containing ammonium. A consequence of this is that the nitrogen oxides are subject to selective chemical reduction over a catalyst which is present in a ceramic filter arrangement and/or which immediately follows the ceramic filter arrangement, in the presence of the substances containing ammonia, urea and/or ammonium. In terms of method, therefore, the denitrification in this case is based on the process of selective catalytic reduction (SCR). Capital costs and operating costs for the catalyst and/or catalytic filter required in the case of SCR, however, are comparatively high. Especially when volume flows of bypass exhaust gas are comparatively low, this process may prove economically to be not very advantageous, thus illustrating the advantageous nature of alternative procedures.

SUMMARY OF THE INVENTION

It is an object of the invention, therefore, to specify an effective method for the denitrification of bypass exhaust gases in a plant for producing cement clinker that does not involve the use of SCR catalysts. A further part of the object of the invention is to propose a plant for the denitrification of bypass exhaust gases that corresponds to the method.

An object of the invention is achieved by passing of the bypass exhaust gas into a first mixing chamber, the bypass exhaust gas being cooled in the first mixing chamber to a temperature of between 800° C. and 950° C., passing of the bypass exhaust gas from the first mixing chamber through a reaction section which is disposed in a conduit, the residence time of the bypass exhaust gas in the reaction section being between 0.5 s and 3 s, and ammonia, aqueous ammonia solution or ammonia-releasing substances being injected into the reaction section for denitrification of the bypass exhaust gas in accordance with the process of selective non-catalytic reduction (SNCR), passing of the bypass exhaust gas from the reaction section into a second mixing chamber, the bypass exhaust gas being cooled in the second mixing chamber to a temperature of between 150° C. and 250° C., and by passing of the bypass exhaust gas from the second mixing chamber to at least one filter for the dedusting of the bypass exhaust gas. An object of the invention is further achieved by a plant corresponding to this method, for the denitrification of bypass exhaust gases in the production of cement clinker.

Following diversion of the bypass exhaust gas stream, therefore, the invention provides a multistage bypass system wherein the hot bypass exhaust gas is first cooled in a first mixing chamber to a temperature of between 800° C. and 950° C. The temperature window thereby established in the NOx-affected bypass exhaust gas is one which is favorable for SNCR. In comparison to the stated conventional methods, in which the bypass exhaust gas temperature is lowered in one step typically to temperatures of 200° C. to 400° C., then, the temperatures here are not lowered in one step. To do so would be to rule out an SNCR approach. By appropriate internal construction of the mixing chamber, particularly of the path length for the gas stream, and by appropriate metering of the injected cooling media, the skilled person instead achieves the desired cooling to 800° C. to 950° C. The method is continued in the next step by the denitrification itself, namely by injection of ammonia, aqueous ammonia solution or ammonia-releasing substances into a reaction section which is disposed in a reactor cavity, implemented primarily as a conduit. The denitrification here is based on the SNCR method, and thus in comparison to the SCR method does not necessitate any costly and difficult-to-operate catalysts. The further parameter needed for effective denitrification, namely the residence time of the bypass exhaust gas in the reaction section (0.5 to 3 seconds), is established through the dimensioning of the conduit, thus more particularly by the length thereof and also the cross-sectional area thereof. Accordingly, there is extensive denitrification without excessive construction volumes, on the one hand, and with avoidance of inadequate flow rates of the bypass exhaust gas, on the other hand. The operating regime according to the invention then provides for cooling of the denitrified bypass exhaust gas in a second mixing chamber. The target final temperature of between 150° C. and 250° C. is achieved here by rapid cooling, and so other pollutants as well, as in the case of conventional methods which operate with rapid cooling (quenching), are condensed on the dust and are separated off together with the particulate solids at a downstream filter. Examples of suitable filters are fabric filters/cloth filters/bag filters.

One preferred embodiment provides for the residence time of the bypass exhaust gas in the reaction section to be between one and two seconds. A passage time of this kind for the bypass exhaust gas proves to be ideally suited to achieving efficient, far-reaching denitrification of the bypass exhaust gas by selective non-catalytic reduction (SNCR), at the temperature levels of 800° C. to 950° C. which are established by cooling in the preceding method step in the first mixing chamber, without having to equip the reaction section for an even longer residence time of the bypass exhaust gas. Since the reaction section is designed as a zone in a conduit or in a conduit-like cavity, the residence time may be determined through the dimensioning, i.e., through the dimensions of the conduit on the basis of the typical values in the specific plant in question. For fine adjustments or for compensating for fluctuations in the flow rate of the bypass exhaust gas in the operation of the plant for producing cement clinker, it is possible, furthermore, to adapt the withdrawal of the volume flow of the bypass exhaust gas or to vary the flow rate in the conduit with the reaction section, by altering the cross-sectional area, for instance.

An embodiment of the invention provides for the bypass exhaust gas to be cooled in the second mixing chamber preferably to a temperature of between 180° C. and 220° C. The primary consideration here is rapid cooling of the bypass exhaust gas. Within this temperature window, formation of dioxins (chlorinated and polychlorinated dibenzodioxins) and furans (chlorinated and polychlorinated dibenzofurans) is largely prevented. Furthermore, the rapid attainment of this final temperature is the most effective way of achieving condensation of pollutants on the dust, which is then deposited downstream in the filter.

In accordance with the invention, the system for purifying the bypass exhaust gas that has been drawn off comprises a multistage system which comprises two mixing chambers; as and when necessary, further mixing chambers may also be provided. In the case of conventional mixing chambers, a cooling medium, typically air or water, is injected into the mixing chamber, and mixes with the bypass exhaust gas through appropriate steering of the gas stream in the mixing chamber, and rapidly cools the bypass exhaust gas in the process. As a preferred embodiment of the invention, accordingly, provision is made for the cooling medium injected into the second mixing chamber to comprise water or fresh air, or a combination of water and fresh air. According to one embodiment, water or fresh air, or a combination of water and fresh air, is also injected into the first mixing chamber, which may also be termed a premixing chamber. The injection of water into a mixing chamber here takes place advantageously with atomization in a spray, using two-fluid nozzles, for instance. In principle, the injection of fresh air (for instance atmospheric ambient air) and/or water may occur at various points distributed over the mixing chamber wall, the aim being for maximum mixing and uniform cooling. A particular embodiment of the invention introduces fresh air, water and cold raw meal or any desired combination, in other words one, two or three components thereof, as a cooling medium into the first mixing chamber. The injection of cold meal has the additional advantage of reducing the sulfur dioxide content of the bypass exhaust gas; the raw meal, with the surface area of its particles, is available as a sorbent for pollutant purification in the subsequent course of the method as well. In the first mixing chamber, furthermore, hot meal, if not yet deacidified, can also be used as a cooling medium and/or as a constituent in the stated cooling media combination.

In order to maintain continuous, uniform gas flow within the bypass system, suction blowers or fans may be used. In one embodiment of the invention, provision is made for a fan to be disposed downstream of the at least one filter in the gas flow direction. This fan may also be a motor-driven compressor. In normal circumstances, the purified bypass exhaust gas is subsequently given off into the environment via a chimney, although is also available to be fed back in, where appropriate, at a suitable point within the overall process of cement production.

In a further embodiment of the invention, the reaction section is fed with at least one sorbent for the additional, pollutant-removing purification of the bypass exhaust gas, for which purpose at least one device for feeding in at least one such sorbent is disposed in the region of the conduit that constitutes the reaction section. Contemplated here in principle are all chemical compounds or sorbents which within the time of passage of the bypass exhaust gas through the reaction section, and at the temperatures prevailing therein, are suitable for ensuring reduction in the level of pollutants. In this case, it is possible for the temperature which is needed for the particular reaction to be established in a defined way in the first mixing chamber. Here, for example, calcium compounds such as calcium carbonate may contribute to desulfurization, and also to reduction of further acidic constituents in the flue gas-like bypass exhaust gas. Activated carbon provides large surface areas for the adsorption of pollutants, such as of heavy metals like mercury. Removal then takes place within the filter unit.

The invention here is oriented to the implementation of SNCR denitrification, but is not confined to this important case. The construction of the bypass system makes it possible in principle for a temperature window to be established by cooling of a hot exhaust gas stream in a first mixing chamber, and for a time window for the residence of the gas stream in a reaction section to be established subsequently. Temperature intervals and time intervals here may also be realized in such a way that, when suitable chemical compounds and/or sorbents are injected into the reaction section, other reactions and/or methods for pollutant-removing purification of the exhaust gas are favored. The skilled person is able here to transpose the principle to the particular group of pollutants that is the primary object for removal from the exhaust gas stream, on the basis of limit values, for instance.

Furthermore, the invention is not confined to plants which have a calciner, since the bypass gases are drawn off in the region of the rotary kiln inlet chamber itself. The process of the invention of purification of bypass exhaust gas in the bypass mixing chamber system proposed can instead be employed universally for kiln exhaust gas purification.

BRIEF DESCRIPTION OF THE DRAWINGS

The invention is illustrated with the FIGURE that follows.
The FIGURE shows a schematic representation of the method of the invention for the denitrification of bypass exhaust gases in a plant for producing cement clinker.

DETAILED DESCRIPTION OF THE PREFERRED EMBODIMENTS

In the FIGURE it is evident schematically that flue gas 1 flows into the rotary kiln inlet chamber 5 from a rotary kiln 2, in which raw meal 3 is sintered to form cement clinker which is then cooled in a clinker cooler 4. Following this in the direction of gas flow, in the working example depicted, are a kiln riser duct 6 and a calciner 7 for the deacidification of the raw meal 3. A fraction of the flue gas 1 (kiln exhaust gas) flows through kiln riser duct 6 and calciner 7 into the heat exchanger 8 (presently a multistage cyclone heat exchanger), which serves for the preheating of the raw meal 3 for cement production.

In accordance with the invention, a part of the flue gas stream 1 emerging from the rotary kiln 2 is drawn off as bypass exhaust gas 9 in the region of the rotary kiln inlet chamber 5, i.e., from the rotary kiln inlet chamber 5 or from the kiln riser duct 6. The bypass exhaust gas 9, which initially on emergence from the rotary kiln 2 has temperatures typically of around 1200° C. to 1300° C., and of around 1000° C. to 1200° C. at the takeoff location, is passed to the first mixing chamber 10. Cooling media fed into the first mixing chamber 10 may be fresh air 11, water 12 or cold meal 12a, or else hot meal, and also any desired mixtures of these. In the working example depicted, atmospheric fresh air 11, water 12 and cold meal 12a are injected, with cold raw meal—that is, raw meal which has not already been heated in the heat exchanger—is advantageous particularly for a reduction in the amount of sulfur dioxide in the bypass exhaust gas. In the first mixing chamber 10, by extensive mixing of the bypass exhaust gas 9 with the cooling media, the bypass exhaust gas 9 is cooled to temperatures of between 800° C. and 950° C.

After emerging from the first mixing chamber 10, i.e., after the first cooling stage, the bypass exhaust gas 9 enters a conduit 13. Injected into the conduit 13 are ammonia, aqueous ammonia solution or ammonia-releasing substances 14. The flow rate of the bypass exhaust gas and the dimensioning of the conduit 13 are matched to one another in such a way as to result in a residence time for the bypass exhaust gas 9 in the conduit 13 of 0.5 s to 3 s, preferably between 1 s and 2 s. The temperature conditions of the bypass exhaust gas 9 and the residence time are therefore established in such a way that there is effective denitrification of the bypass exhaust gas by the process of selective non-catalytic reduction (SNCR) over a reaction section 15 which is formed within the interior of the conduit. Ammonia 14 here is converted by thermolysis into nitrogen and water. The temperatures of the bypass exhaust gas 9 without cooling or before cooling in the first mixing chamber 10 would be too high for such an SNCR, since the reducing agents would undergo combustion at such high temperatures. Additional feeding of sorbents which ensure further pollutant-removing purification of the bypass exhaust gas 9 is possible in the region of the reaction section 15.

Following completed denitrification by SNCR in the reaction section 15, the bypass exhaust gas 9 is passed into a second mixing chamber 16. In the second mixing chamber 16 it is rapidly cooled to the desired final temperature of between 150° C. and 250° C., preferably between 180° C. and 220° C. This second cooling stage is accomplished by injection of water 12 and/or fresh air 11 into the second mixing chamber 16. Rapid cooling to these temperatures minimizes the formation of dioxins and furans and leads to condensation of pollutants on the dust. The bypass exhaust gas 9 thus conditioned is subsequently dedusted in at least one filter 17. Suitability here is possessed by fabric filters/cloth filters/bag filters, and the use of electrostatic filters, and also a combination of different types of filter in series, may also be advantageous. In the working example, the purified bypass exhaust gas 9 subsequently passes through a fan 18, and is drawn off by a chimney 19 and released into the environment. In the bypass system as a whole, such as especially in the mixing chambers, effective commixing and a correspondingly uniform temperature field, and also a suitable bypass exhaust gas flow rate, are important for effective method steps. Depending on the arrangement and the associated path lengths, it may be advantageous in particular plants to provide internals in the gas pathway that ensure effective commixing, and also to provide additional fans in the bypass section, which introduce air into the bypass exhaust gas flow through continuous or discontinuous operation.

As a result of the construction according to the invention, altered relative to conventional procedures, and by the altered operating regime, the means of denitrification of the bypass exhaust gases is also effective and is also favorable in terms of acquisition and in operation, and removes the need for SCR catalysts to be used.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for the denitrification of bypass exhaust gases in a plant for producing cement clinker, wherein the plant has a rotary kiln for the sintering of raw meal to cement clinker, and has a calciner for the deacidification of the raw meal, downstream of the rotary kiln in the kiln exhaust gas flow direction, the rotary kiln has a rotary kiln inlet chamber which is connected directly or via a kiln riser duct to the calciner, and the bypass exhaust gas is drawn off in the region of the rotary kiln inlet chamber, comprising the steps:

passing of the bypass exhaust gas into a first mixing chamber, where
the bypass exhaust gas is cooled in the first mixing chamber to a temperature of between 800° C. and 950° C. so that chloride compounds remain in a gaseous phase after the bypass exhaust gas is cooled, passing of the bypass exhaust gas from the first mixing chamber through a reaction section disposed in a conduit, where
the residence time of the bypass exhaust gas in the reaction section is between 0.5 s and 3 s, and where
ammonia, aqueous ammonia solution or ammonia-releasing substances are injected into the reaction section for the denitrification of the bypass exhaust gas by the process of selective non-catalytic reduction (SNCR), passing of the bypass exhaust gas from the reaction section into a second mixing chamber, where
the bypass exhaust gas is cooled in the second mixing chamber to a temperature of between 150° C. and 250° C. to remove chloride compounds from the gaseous phase by deposition, and by passing of the bypass exhaust gas from the second mixing chamber to at least one filter for the dedusting of the bypass exhaust gas.

2. The method as claimed in claim 1, wherein the residence time of the bypass exhaust gas in the reaction section is between 1 s and 2 s.

3. The method as claimed in claim 1, wherein cooling media introduced into the first mixing chamber comprise one, two or three cooling media from the group consisting of fresh air, water, and cold raw meal, and into the second mixing chamber comprise at least one of water or fresh air.

4. The method as claimed in claim 1, wherein the bypass exhaust gas is cooled in the second mixing chamber to a temperature of between 180° C. and 220° C.

5. The method as claimed in claim 1, wherein the reaction section is fed with at least one sorbent for the additional, pollutant-removing purification of the bypass exhaust gas.

* * * * *